United States Patent
Ye et al.

(10) Patent No.: US 11,060,154 B2
(45) Date of Patent: Jul. 13, 2021

(54) INDUSTRIALISED PRODUCTION PROCESS OF TOTAL NUTRIENT PURE POWDERED SUGAR AND LIQUID SYRUP AND EQUIPMENT

(71) Applicant: GUANGXI YEMAO DRINKING & FOOD CO., LTD., Nanning (CN)

(72) Inventors: Li-Na Ye, Nanning (CN); Jia-Quan Chen, Nanning (CN); He-Guang Wei, Nanning (CN); Hai-Xin Huang, Nanning (CN); Bo Qin, Nanning (CN)

(73) Assignee: GUANGXI YEMAO DRINKING & FOOD CO., LTD., Guangxi (CN)

( * ) Notice: Subject to any disclaimer, the term of this patent is extended or adjusted under 35 U.S.C. 154(b) by 292 days.

(21) Appl. No.: 16/083,707

(22) PCT Filed: Mar. 10, 2017

(86) PCT No.: PCT/CN2017/076353
§ 371 (c)(1),
(2) Date: Sep. 10, 2018

(87) PCT Pub. No.: WO2017/152882
PCT Pub. Date: Sep. 14, 2017

(65) Prior Publication Data
US 2020/0115768 A1    Apr. 16, 2020

(30) Foreign Application Priority Data
Mar. 11, 2016  (CN) .................. 201610139496.X

(51) Int. Cl.
*C13B 20/00* (2011.01)
*C13B 20/16* (2011.01)
(Continued)

(52) U.S. Cl.
CPC ............ *C13B 20/165* (2013.01); *B01D 36/02* (2013.01); *B01D 61/147* (2013.01); *B01D 71/02* (2013.01);
(Continued)

(58) Field of Classification Search
None
See application file for complete search history.

(56) References Cited

FOREIGN PATENT DOCUMENTS

| CN | 201589508 U | * | 9/2010 |
| CN | 102459155 A | | 6/2012 |

(Continued)

OTHER PUBLICATIONS

CN-201589508-U—English translation (Year: 2010).*
(Continued)

*Primary Examiner* — Stefanie J Cohen
(74) *Attorney, Agent, or Firm* — Birch, Stewart, Kolasch & Birch LLP

(57) ABSTRACT

Provided is a production process for powdered sugar and liquid syrup, comprising the steps of primary pressing sugar cane juice extraction, three-stage physical filtration, and sugar boiling, wherein the step of the three-stage physical filtration respectively uses a sieve plate, a bagasse separator and a micro-filtration membrane for filtration. The bagasse separator comprises a screen cylinder transversely arranged inside a separation bin. The inlet and outlet of the screen cylinder are respectively connected to a feeding bin and a discharging bin. A juice outlet and a bagasse outlet are respectively provided under the separation bin and the discharging bin. A propeller blade component is provided inside the screen cylinder. The propeller blade component is formed by combining vertical mixing blades with helical blades.

3 Claims, 2 Drawing Sheets

(51) Int. Cl.
*B01D 36/02* (2006.01)
*B01D 61/14* (2006.01)
*B01D 71/02* (2006.01)
*B01D 71/06* (2006.01)
*C13B 10/06* (2011.01)
*C13B 25/00* (2011.01)
*C13B 50/00* (2011.01)

(52) U.S. Cl.
CPC .............. *B01D 71/06* (2013.01); *C13B 10/06* (2013.01); *C13B 25/00* (2013.01); *C13B 50/00* (2013.01)

(56) References Cited

FOREIGN PATENT DOCUMENTS

| CN | 102489155 A | * | 6/2012 |
| CN | 104843221 A | | 5/2015 |

OTHER PUBLICATIONS

CN-102489155-A—english translation (Year: 2012).*
Austrailian Office Action, dated Aug. 14, 2019, for Austrailian Application No. 2017230440.

* cited by examiner

INDUSTRIALISED PRODUCTION PROCESS OF TOTAL NUTRIENT PURE POWDERED SUGAR AND LIQUID SYRUP AND EQUIPMENT

BACKGROUND OF THE INVENTION

Technical Field

The present invention is related to sugar production, and more particularly to an industrialised production process of total nutrient pure powdered sugar and liquid syrup and equipment.

Description of Related Art

Sugar cane has edible plant stems and takes one year to reach maturity, but other fruits usually take only months to mature from bloom to harvest. There are more nutrients in the fruit when it takes a longer time to reach maturity, and therefore sugar cane is much more nutritious than other fruits. Sugar cane has plenty of sugar, water, and nutrients such as amino acids, octacosanol, polyphenols, calcium, iron, zinc, selenium, vitamin B1, B2, B6, and C, etc. However, we could hardly acquire these nutrients because plenty of them exist in sugar cane peel and sugar cane is usually eaten after peeling. In an industrialised production process of sugar, although these nutrients could be released by crushing and pressing sugar cane, these nutrients would further be destroyed and removed in the following four steps:
  (a). chemical additives such as lime, phosphoric acid, and sulfur dioxide gas are usually added into the sugar cane juice for pH adjustment and clarification during sugar refining process, and these chemical additives would destroy the aforementioned nutrients;
  (b). after clarification, the sugar cane juice is further decolorized to remove colored substances by ion exchange resin or floating clarification, however, plenty of nutrients in the sugar cane are colored and would be removed during decolorization;
  (c). sugar is crystallized in the sugar refining process, and other elements are excluded while the sugar crystal is growing; and
  (d). molasses having rich nutrients is separated from the processed juice to form white sugar crystal in the sugar refining process.

Consequently, even though pure and white sugar could be provided by the industrialised production process introduced from the West, plenty of valuable nutrients in sugar cane are lost during the production process.

The traditional production process of sugar in China could retain partial nutrients of the sugar cane, however, the sugar cane is not crushed during juice extraction, and valuable nutrients existing in the peel such as octacosanol could not be released efficiently. In the partial traditional production process, lime is added in the step of clarification as well and the nutrients in the sugar cane juice would further be destroyed. In addition, the traditional technology and equipment of filtration and clarification are quite simple and could not achieve the requirement of industrialised production. The sugar product containing a higher content of impurities such as mud and bagasse has a poor taste, a high bacterial content, and even pesticide remained in the soil following the mud, thereby being harmful to health.

A production process of golden yellow sugar is disclosed in China patent application No. CN201410235021.1, comprising a series of steps of: pressing the sugar cane, juice extraction, pre-filtration, filtration with the micro-filtration membrane, pre-concentration, decolorization with ion exchange resin, concentration, crystallization, and drying. The production process could provide golden yellow sugar without molasses, and could solve the aforementioned problem in step (a), but could not solve the aforementioned problems in steps (b) to (d) with efficiency. Consequently, plenty of nutrients in the sugar cane are still lost in golden yellow sugar. A production process of raw sugar is disclosed in China patent application No. CN201410208178.5. The production process utilizes the sugar cane juice derived from the sugar refinery as raw material, comprising the steps of: adjusting pH value to 5.8-6.6 by adding lime; heating the juice and removing the froth floating to the surface; removing impurities by microfiltration; obtaining juice concentrates at a Brix of 60-65 degrees by evaporation; boiling the juice concentrates at temperature of 125-130° C. at atmospheric pressure to obtain liquid syrup at a Brix of 95-98 degrees, and quick agitation for crystallization. Lime is added in this production process as well, and the additive is added for removing the froth floating to the surface. After removing the froth, many longer fibers remain in the processed juice and make the micro-filtration membrane get stuck, which could not satisfy industrialised operation. Moreover, in the aforementioned production processes, the step of clarification and filtration is a combination of chemical and physical processes, and the sugar cane is pressed through a series of roller mills. After the sugar cane is pressed through the first roller mill, external water is utilized to wash the bagasse for flushing the sugar remained therein. Consequently, the sugar cane juice is a mixture of natural juice and external water, resulting in contamination of the sugar product.

BRIEF SUMMARY OF THE INVENTION

In view of the above, an object of the present invention is to provide an industrialised production process of total nutrient pure powdered sugar and liquid syrup. The production process inventively utilizes three-stage physical filtration instead of traditional filtration which is a combination of physical and chemical processes, and therefore sugar could be refined with a whole physical and natural method. Meanwhile, the sugar cane juice is obtained by pressing the sugar cane through the first roller mill to preserve total nutrients of sugar cane, and no external water is added to wash the bagasse. Consequently, the sugar product is fully derived from the sugar cane, and the disadvantages of losing most nutrients in the present industrialised production process, being unable to obtain partial valuable nutrients and containing excess impurities in the traditional production process could be avoided.

To achieve the object mentioned above, the present invention provides an industrialised production process of total nutrient pure powdered sugar and liquid syrup, comprises steps of:
  (a). primary pressing sugar cane juice extraction: pressing the sugar cane with conventional roller mill equipment, and the sugar cane juice pressed through the first roller mill is utilized for the following steps. The sugar cane juice preserves the total nutrients of the sugar cane, and no external water is added for washing the bagasse. Water contained in the sugar product either powdered sugar or liquid syrup is totally derived from the sugar cane and would be healthier.
  (b). first-stage physical filtration: a sieve plate is designed for the roller mill and mounted under the roller of the first roller mill so as to proceed the first-stage physical filtration with the sugar cane juice obtained in step (a) without power consumption, wherein the sieve plate is provided with a sieve having 50-200 meshes. After the first-stage physical filtration, mill mud, and all sliced, long-shaped bagasse and all sliced, long-shaped impurities in the sugar cane juice that are filterable by the sieve having 50 to 200 meshes are removed, but many visible, fine fibers and impurities remain in the sugar cane juice.

In this step, the sieve plate could be replaced with a high-frequency sieve shaker with a sieve having 50-150 meshes, and additional power supply is needed.

(c). second-stage physical filtration: a bagasse separator is utilized to proceed the second-stage physical filtration with the sugar cane juice obtained in step (b), wherein the bagasse separator is provided with a sieve having 200-500 meshes. After the second-stage physical filtration, the fine fibers and fine impurities in the sugar cane juice are removed, but many suspended substances remain in the sugar cane juice, which makes the sugar cane juice turbid and not clear.

(d). third-stage physical filtration: the sugar cane juice obtained in step (c) is heated to a temperature of 50-90□ and a micro-filtration membrane having 50-350 nm diameter holes is utilized to proceed the third-stage physical filtration. After the third-stage physical filtration, bacteria, trace mill mud and trace impurities in the sugar cane juice are removed, which makes the sugar cane juice transparent and very clean.

In this step, the micro-filtration membrane could be a ceramic membrane or an organic polymer membrane.

(e). sugar boiling: the sugar cane juice obtained after the third-stage physical filtration is boiled with conventional sugar boiling methods, as is well known in the industry. The total nutrient pure liquid syrup is obtained when 50-60 wt % of water contained in the sugar cane juice has evaporated, and the water contained in the liquid syrup is fully derived from the sugar cane; the total nutrient pure powdered sugar is obtained when 95 wt % of water contained in the sugar cane juice has evaporated, wherein the powdered sugar is not large sugar crystals and would be melted once eaten. The powdered sugar could further be processed for sliced sugar or sugar block.

In step (c), the sugar cane juice has high viscosity, and the sieve gets stuck easily while filtering out fine fibers having a size of 200-500 meshes in the sugar cane juice with the conventional physical filtration equipment, which makes the conventional physical filtration equipment unable to operate continuously. However, the micro-filtration membrane in the third-stage physical filtration would get stuck seriously while fine fibers and impurities having a size only smaller than 200 meshes in the sugar cane juice are filtered out in step (c), and frequent membrane washing is needed. It is required to wash the membrane every 8 hours and takes more than 2 hours for each washing, resulting in increased cost of the membrane and discontinuous operation. The bagasse separator provided by the present invention would not get stuck easily and could operate stably. The bagasse separator could efficiently filter out fine fibers having a size of 200-500 meshes in the sugar cane juice such that the micro-filtration membrane in the third-stage physical filtration could be washed every 2-3 days, whereby to reduce the cost of the membrane and operation.

The bagasse separator includes a housing 4 and a rack 7, wherein the housing 4 is transversely disposed on the rack 7. The bagasse separator includes a feeding bin, a separation bin, and a discharging bin in the housing 4, and includes a feeding inlet 5 disposed on the feeding bin, a juice outlet 6 provided under the separation bin, and a bagasse outlet 8 provided under the discharging bin. The bagasse separator includes a screen cylinder 3 transversely arranged inside the separation bin. The screen cylinder 3 includes an inlet, an outlet, and a propeller blade component 2, wherein the inlet and the outlet are respectively connected to the feeding bin and the discharging bin, and the propeller blade component 2 is driven by a deceleration motor 1. The propeller blade component 2 is formed by combining vertical mixing blades 2.1 with helical blades 2.2. The deceleration motor 1 drives the vertical mixing blades 2.1 and the helical blades 2.2 to rotate via a rotating shaft. After the sugar cane juice is injected into the bagasse separator via the feeding inlet 5, the juice passes through the high-speed rotating propeller blade component 2 to form a centrifugal jet continuously flowing toward the screen cylinder 3 with high tension. The sugar cane juice passing through the screen cylinder 3 is filtered and discharged from the juice outlet 6. The bagasse and impurities are scratched by the propeller blade component 2 from the inner side of the screen cylinder 3 and delivered to the bagasse outlet 8 for discharge. The bagasse separator could separate the sugar cane juice from the bagasse, and meanwhile, the bagasse in the screen cylinder 3 could be removed by the centrifugal jet and scratched by the helical blades 2.2, whereby to prevent the screen cylinder 3 from getting stuck and to discharge the bagasse with efficiency.

The advantage of the present invention is that the production process without steps of decolorization and crystallization is simpler and less energy consumption than the conventional sugar refining process. Most important of all, no chemical additives and external water are added during the production process. The sugar product is fully derived from the sugar cane and preserves rich nutrients of the sugar cane. Consequently, the powdered sugar and liquid syrup provided by the present invention is different from the white sugar, yellow sugar, raw sugar, and liquid syrup currently for sale.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
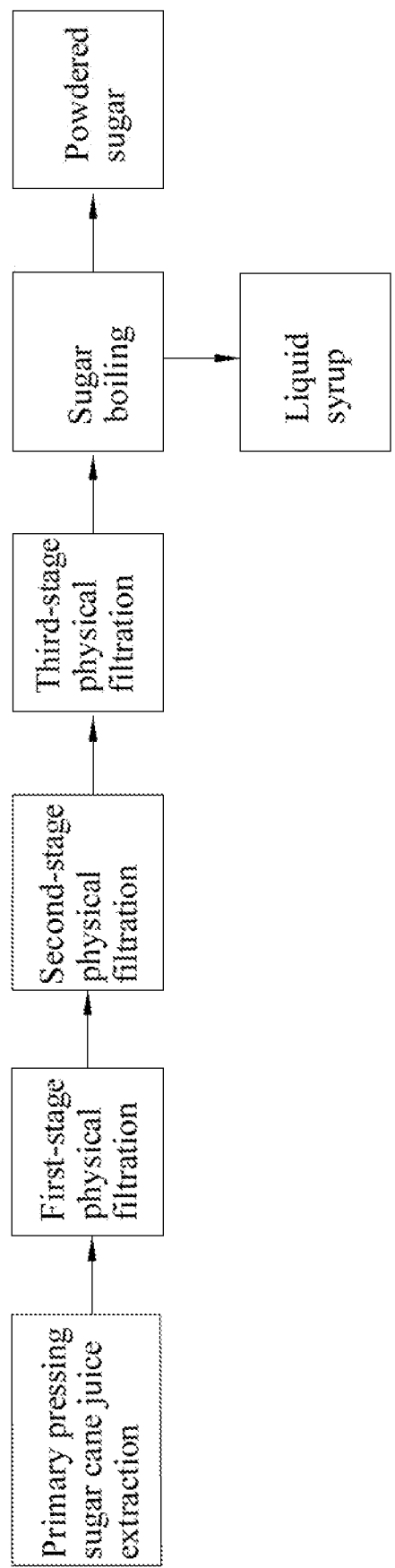
FIG. 1 is a flowchart showing an industrialised production process of total nutrient pure powdered sugar and liquid syrup according to the present invention.
Figure 2:
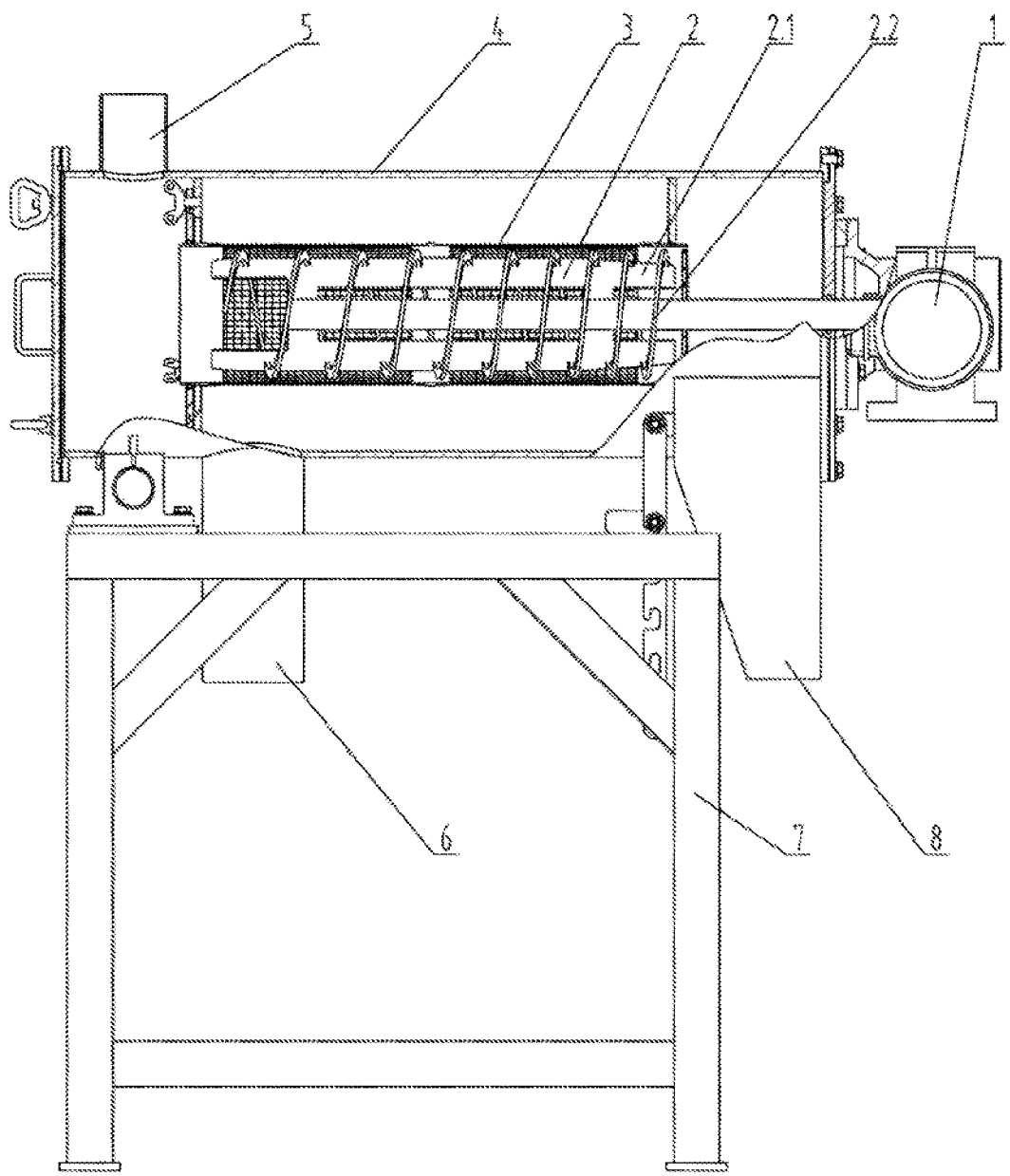
FIG. 2 is a schematic view showing the bagasse separator utilized during the second-stage filtration according to the present invention.

The following illustrative embodiments and drawings are provided to illustrate the disclosure of the present invention, these and other advantages and effects can be clearly understood by persons skilled in the art after reading the disclosure of this specification.

Example 1

(a). primary pressing sugar cane juice extraction: pressing the sugar cane with conventional roller mill equipment, and the sugar cane juice pressed through the first roller mill is utilized for the following steps.

(b). first-stage physical filtration: a sieve plate is designed for the roller mill and mounted under the roller of the first roller mill so as to proceed the first-stage physical filtration with the sugar cane juice obtained in step (a) without power consumption, wherein the sieve plate is provided with a sieve having 100 meshes.

(c). second-stage physical filtration: a bagasse separator is utilized to proceed the second-stage physical filtration with the sugar cane juice obtained in step (b), wherein the bagasse separator is provided with a sieve having 300 meshes.

(d). third-stage physical filtration: the sugar cane juice obtained in step (c) is heated to a temperature of 80□ and a ceramic micro-filtration membrane having 100 nm diameter holes is utilized to proceed the third-stage physical filtration.

(e). sugar boiling: the sugar cane juice obtained after the third-stage physical filtration is boiled with conventional sugar boiling methods, as is well known in the industry. The total nutrient pure liquid syrup is obtained when 50 wt % of water contained in the sugar cane juice has evaporated, and the total nutrient pure powdered sugar is obtained when 95 wt % of water contained in the sugar cane juice has evaporated.

In this embodiment, the sugar cane juice obtained after three-stage physical filtration was analyzed in Guangxi Center of Analysis and Test Research, wherein the analyzed sample had a sugar content of 20 wt %. The analyzed sample contained amino acids 504 mg/100 mL, octacosanol 0.26 mg/100 mL, polyphenols 57.4 mg/100 mL, organic acids 105 mg/100 mL, calcium 3.5 mg/100 g, iron 0.61 mg/100 g, selenium 0.003 mg/kg, zinc 1.81 mg/kg, vitamin C 0.88 mg/100 mL, vitamin B1 3.26 □g/100 mL, vitamin B2 18.2 □g/100 mL, and vitamin B6 387 □g/100 mL. According to the analysis report, the sugar cane juice obtained after three-stage physical filtration could efficiently preserve total nutrients of sugar cane, and powdered sugar and liquid syrup preserving total nutrients could be provided by the production process. The analyzed sample was detected with harmful substances as well, and contained Arsenic <0.01 mg/kg (that is, Arsenic is undetectable), Mercury 0.0008 mg/kg, Cadmium 0.0031 mg/kg, and Plumbum 0.008 mg/kg, each of which was much lower than the national standard. In addition, pesticides such as Diuron and Carbofuran were not found in the analyzed sample.

Example 2

(a). primary pressing sugar cane juice extraction: pressing the sugar cane with conventional roller mill equipment, and the sugar cane juice pressed through the first roller mill is utilized for the following steps.

(b). first-stage physical filtration: a sieve plate is designed for the roller mill and mounted under the roller of the first roller mill so as to proceed the first-stage physical filtration with the sugar cane juice obtained in step (a) without power consumption, wherein the sieve plate is provided with a sieve having 50 meshes.

(c). second-stage physical filtration: a bagasse separator is utilized to proceed the second-stage physical filtration with the sugar cane juice obtained in step (b), wherein the bagasse separator is provided with a sieve having 200 meshes.

(d). third-stage physical filtration: the sugar cane juice obtained in step (c) is heated to a temperature of 50□ and a ceramic micro-filtration membrane having 350 nm diameter holes is utilized to proceed the third-stage physical filtration.

(e). sugar boiling: the sugar cane juice obtained after the third-stage physical filtration is boiled with conventional sugar boiling methods, as is well known in the industry. The total nutrient pure liquid syrup is obtained when 50 wt % of water contained in the sugar cane juice has evaporated, and the total nutrient pure powdered sugar is obtained when 95 wt % of water contained in the sugar cane juice has evaporated.

Example 3

(a). primary pressing sugar cane juice extraction: pressing the sugar cane with conventional roller mill equipment, and the sugar cane juice pressed through the first roller mill is utilized for the following steps.

(b). first-stage physical filtration: a sieve plate is designed for the roller mill and mounted under the roller of the first roller mill so as to proceed the first-stage physical filtration with the sugar cane juice obtained in step (a) without power consumption, wherein the sieve plate is provided with a sieve having 200 meshes.

(c). second-stage physical filtration: a bagasse separator is utilized to proceed the second-stage physical filtration with the sugar cane juice obtained in step (b), wherein the bagasse separator is provided with a sieve having 500 meshes.

(d). third-stage physical filtration: the sugar cane juice obtained in step (c) is heated to a temperature of 90□ and a ceramic micro-filtration membrane having 50 nm diameter holes is utilized to proceed the third-stage physical filtration.

(e). sugar boiling: the sugar cane juice obtained after the third-stage physical filtration is boiled with conventional sugar boiling methods, as is well known in the industry. The total nutrient pure liquid syrup is obtained when 60 wt % of water contained in the sugar cane juice has evaporated, and the total nutrient pure powdered sugar is obtained when 95 wt % of water contained in the sugar cane juice has evaporated.

In this embodiment, the total nutrient pure powdered sugar was analyzed in Guangxi Center of Analysis and Test Research. The analyzed sample contained amino acids 1.08 g/100 g, octacosanol 2.0 mg/100 g, polyphenols 386 mg/100 g, calcium 86.66 mg/100 g, iron 3.10 mg/100 g, selenium 0.0472 mg/kg, zinc 6.5 mg/kg, vitamin C 8 mg/100 g, vitamin B1 358 µg/100 g, vitamin B2 620 µg/100 g, and vitamin B6 19.2 mg/100 g. According to the analysis report, the total nutrient pure powdered sugar could efficiently preserve total nutrients of sugar cane.

It must be pointed out that the embodiments described above are only some embodiments of the present invention. All equivalent structures which employ the concepts disclosed in this specification and the appended claims should fall within the scope of the present invention.

It must be pointed out that the embodiments described above are only some embodiments of the present invention. All equivalent structures which employ the concepts disclosed in this specification and the appended claims should fall within the scope of the present invention.

What is claimed is:

1. A method for producing a total nutrient pure powdered sugar and a total nutrient pure liquid syrup, comprising steps of:
   (1) extracting primary pressing sugar cane juice: pressing sugar cane with a roller mill equipment; sugar cane juice pressed through a first roller mill is utilized for the following steps;
   (2) proceeding a first-stage physical filtration: providing a sieve plate for the roller mill equipment; the sieve plate is mounted under a roller of the first roller mill to proceed the first-stage physical filtration with the sugar cane juice obtained in step (1), wherein the sieve plate is provided with a sieve having 50 to 200 meshes; after the first-stage physical filtration, mill mud, and all sliced bagasse and sliced impurities that are filterable by the sieve having 50 to 200 meshes are removed from the sugar cane juice;

(3) proceeding a second-stage physical filtration: utilizing a bagasse separator to proceed the second-stage physical filtration with the sugar cane juice obtained in step (2), wherein the bagasse separator is provided with a sieve having 200 to 500 meshes; after filtration, fibers and impurities that are filterable by the sieve having 200 to 500 meshes are removed from the sugar cane juice;

(4) proceeding a third-stage physical filtration: heating the sugar cane juice obtained in step (3) to a temperature of 50 to 90° C.; a micro-filtration membrane having 50 to 350 nm diameter holes is utilized to proceed the third-stage physical filtration; after filtration, bacteria, trace mill mud and trace impurities are removed from the sugar cane juice; and (5) boiling the sugar cane juice obtained after the third-stage physical filtration with a sugar boiling means; the total nutrient pure liquid syrup is obtained when 50 to 60 wt % of water contained in the sugar cane juice has evaporated; the total nutrient pure powdered sugar is obtained when 95 wt % of water contained in the sugar cane juice has evaporated.

2. The method of claim 1, wherein the micro-filtration membrane utilized in step (4) is a ceramic membrane or an organic polymer membrane.

3. The method of claim 1, wherein the sieve plate is utilized to proceed the first-stage physical filtration with the sugar cane juice obtained in step (1) without power consumption.

* * * * *